United States Patent [19]
Vannatta

[11] Patent Number: 5,630,213
[45] Date of Patent: May 13, 1997

[54] RF ANTENNA SWITCH AND METHOD OF OPERATING THE SAME

[75] Inventor: Louis J. Vannatta, Crystal Lake, Ill.

[73] Assignee: Motorola, Inc., Schaumburg, Ill.

[21] Appl. No.: 490,523

[22] Filed: Jun. 14, 1995

Related U.S. Application Data

[63] Continuation of Ser. No. 997,275, Dec. 22, 1992, abandoned.

[51] Int. Cl.$^6$ ............................................. H04B 7/08
[52] U.S. Cl. ........................ 455/133; 455/137; 455/140; 455/188.1; 455/277.1
[58] Field of Search ........................... 455/78, 82, 83, 455/84, 89, 132, 133, 134, 137, 140, 188.1, 188.2, 189.1, 191.3, 192.1, 272, 273, 277.1, 280, 323, 325, 326

[56] References Cited

U.S. PATENT DOCUMENTS

| | | | |
|---|---|---|---|
| 3,195,059 | 7/1965 | Adams | 455/137 |
| 3,800,222 | 3/1974 | Kowalewski . | |
| 4,380,822 | 4/1983 | Broton . | |
| 4,418,428 | 11/1983 | Evans | 455/191.2 |
| 4,596,045 | 6/1986 | Maier | 455/140 |
| 4,814,882 | 3/1989 | Nuimura | 455/277.1 |
| 4,914,714 | 4/1990 | Tamura | 455/277.1 |
| 4,920,285 | 4/1990 | Clark et al. . | |
| 4,958,382 | 9/1990 | Imanishi | 455/277.1 |
| 4,982,442 | 1/1991 | Sarokhanian . | |
| 4,987,392 | 1/1991 | Clark et al. . | |
| 5,001,776 | 3/1991 | Clark . | |
| 5,054,114 | 10/1991 | Erickson | 455/78 |
| 5,060,293 | 10/1991 | Kok et al. . | |
| 5,203,025 | 4/1993 | Anvari et al. | 455/134 |
| 5,222,253 | 6/1993 | Heck | 455/78 |
| 5,339,462 | 8/1994 | Staudinger et al. | 455/326 |
| 5,390,357 | 2/1995 | Nobusawa et al. | 455/134 |

FOREIGN PATENT DOCUMENTS

| | | | |
|---|---|---|---|
| 81347 | 5/1983 | Japan | 455/137 |

*Primary Examiner*—Reinhard J. Eisenzopf
*Assistant Examiner*—Thanh Le
*Attorney, Agent, or Firm*—Kevin D. Kaschke

[57] ABSTRACT

A radio frequency (RF) antenna switch (136) and associated method of operating the same is provided for switching between a first antenna (109) and a second antenna (111). A first mixer (125) has an input terminal 124 coupled to the first antenna (109) and has an output terminal 126. A second mixer (129) has an input terminal 128 coupled to the second antenna (111) and has an output terminal 130 coupled to the output terminal of the first mixer (125). The first mixer (125) and the second mixer (129) are alternatively enabled responsive to the state of an antenna select signal (141). Additionally, the common output terminals 126 and 130 of both the first mixer (125) and the second mixer (129) are matched to a first intermediate frequency stage (131). The RF antenna switch (136) advantageously provides low loss and low current drain.

14 Claims, 3 Drawing Sheets

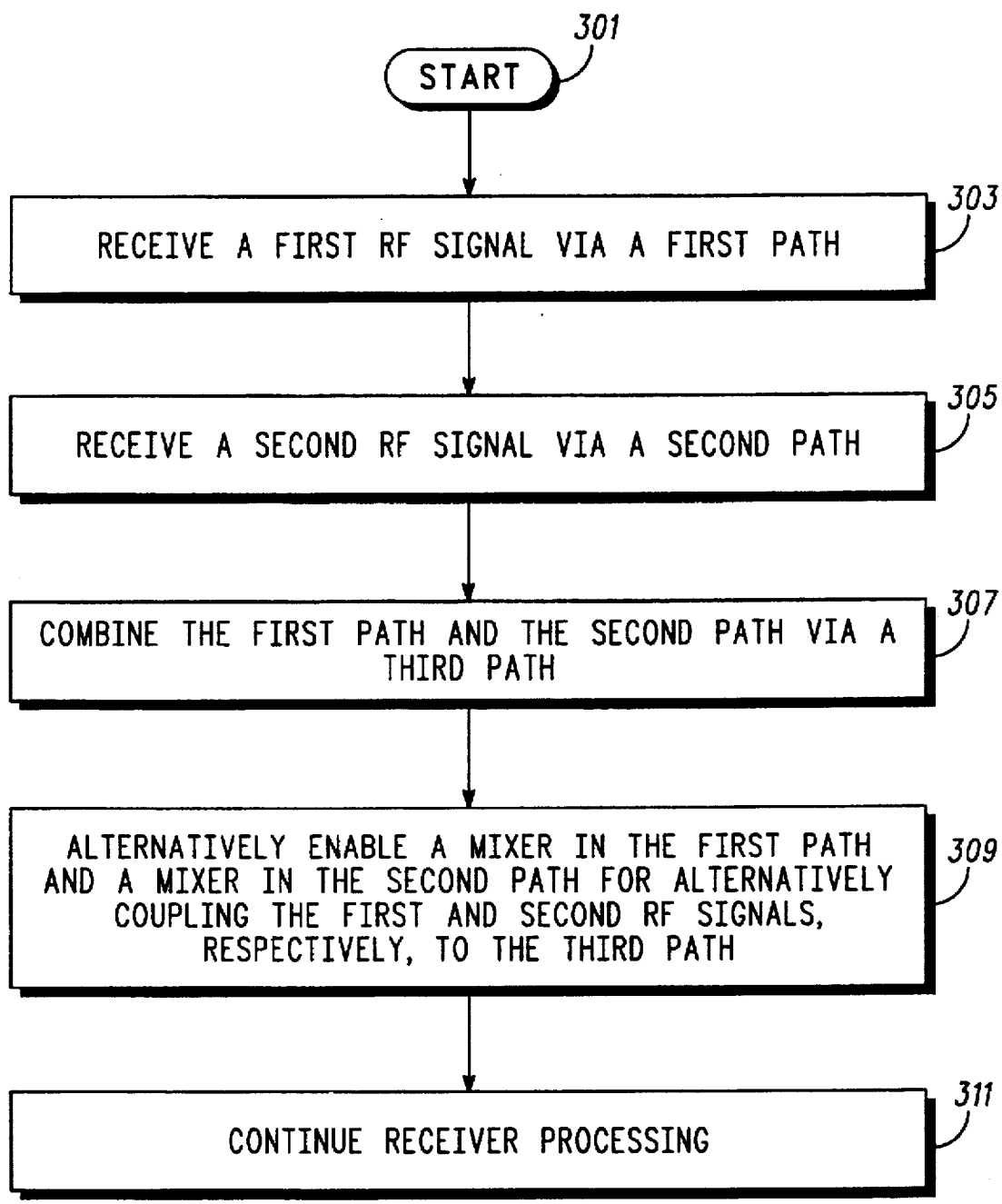

RF ANTENNA SWITCH AND METHOD OF OPERATING THE SAME

This is a continuation of application Ser. No. 07/997,275, filed Dec. 22, 1992 and now abandoned.

FIELD OF THE INVENTION

The present invention relates generally to electronic switches, and more particularly, to a radio frequency (RF) antenna switch and method of operating the same for use in diversity receivers.

BACKGROUND OF THE INVENTION

Receivers performing diversity functions are well known in the art for overcoming transmission errors. A particular type of diversity operation for receivers is known as antenna diversity. Receivers performing antenna diversity have an RF antenna switch before the demodulator to selectively receive RF signals from one or more antennas. Typically, the RF antenna switch is located at the input of the receiver.

A generic RF antenna switch is shown in U.S. Pat. No. 5,001,776. Several types of RF antenna switches for switching between RF signal paths are well known in the art. A reed switch used as an antenna switch is taught in U.S. Pat. No. 3,800,222. A circulator used as an antenna switch is taught in U.S. Pat. No. 4,380,822. A relay used as an antenna switch is taught in U.S. Pat. No. 4,982,442 and U.S. Pat. No. 5,060,293. A gallium arsenide field effect transistor is used as an antenna switch is taught in U.S. Pat. No. 4,920,285 and U.S. Pat. No. 4,987,382. A pin diode is also conventionally used as an RF antenna switch.

However, these conventional RF antenna switches have either high loss that reduces the receiver's sensitivity or high current drain. Portable receivers, such as radiotelephones, need high receiver sensitivity and low current drain. Therefore, there is a need for an RF antenna switch that has low loss and low current drain.

BRIEF DESCRIPTION OF THE DRAWINGS

FIG. 3 is a process flow diagram describing the operation of a receiver portion of the transceiver of FIG. 1.

DETAILED DESCRIPTION OF A PREFERRED EMBODIMENT

Figure 1:
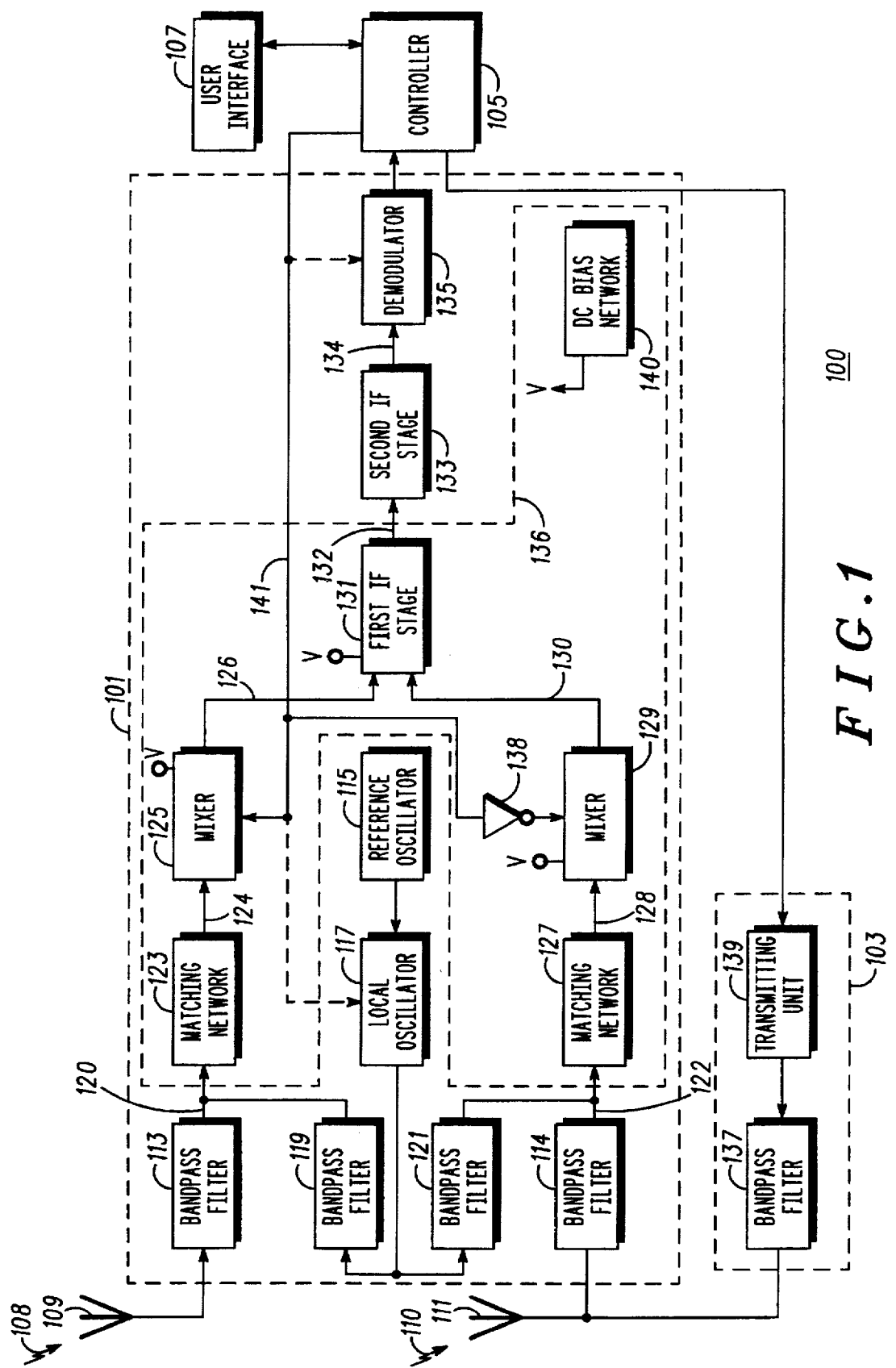
FIG. 1 is a block diagram of an RF transceiver including a radio frequency (RF) antenna switch and constructed in accordance with a preferred embodiment of the present invention.

Referring now to FIG. 1, there is shown a block diagram of a radio frequency (RF) transceiver 100 including an RF antenna switch 136 and constructed in accordance with a preferred embodiment of the present invention. The transceiver 100 generally includes a receiver 101, a transmitter 103, a controller 105, a user interface 107, a first antenna 109, and a second antenna 111. The first antenna 109 is coupled to the receiver 101 for receiving RF signals. The second antenna 111 is coupled to the receiver 101 for receiving RF signals and coupled to the transmitter 103 for transmitting RF signals.

The receiver 101 includes a first path for receiving RF signals from the first antenna 109 and a second path for receiving RF signals from the second antenna 111. The first path includes in series: the first antenna 109, a bandpass filter 113, a matching network 123 and a mixer 125. The second path includes in series: the second antenna 111, a bandpass filter 114, a matching network 127 and a mixer 129. A local oscillator 117, coupled to a reference oscillator 115, provides a reference signal to bandpass filters 119 and 121. The bandpass filters 119 and 127 in turn are coupled to matching networks 123 and 127, respectively. The first path terminating with mixer 125 and the second path terminating with mixer 129 are combined into a common third path at the first intermediate frequency (IF) stage 131. The third path includes in series: the first IF stage 131, a second IF stage 133 and a demodulator 135. The demodulator 135 is coupled to the controller 105 for processing the received RF signal and for providing communication with the user interface 107. A DC bias network 140 provides a DC reference voltage for the mixers 125 and 129 and the first IF stage 131.

The receiver 101 includes an RF antenna switch 136 to perform antenna diversity. The RF antenna switch 136 includes the matching networks 123 and 127, the mixers 125 and 129, an inverter 138, the first IF stage 131 and the DC bias network 140. The controller 105 generates an antenna select signal on line 141 to alternatively enable the mixer 125 and mixer 129 via the inverter 138. For example, if the signal on line 141 is high, the mixer 125 is enabled and the mixer 129 is disabled. If the signal on line 141 is low, the mixer 125 is disabled and the mixer 129 is enabled. Enabling the mixer 125 allows the first path for receiving RF signals from the first antenna 109 to be coupled to the first IF stage 131. Enabling the mixer 129 allows the second path for receiving RF signals from the second antenna 111 to be coupled to the first IF stage 131.

The antenna switch of the present invention is advantageous over the antenna switches of the prior art. While the prior art antenna switches have either high loss or high current drain, the antenna switch of the present invention has both low loss and low current drain.

Switching between antenna paths after a gain stage (i.e. after mixers 125 and 129) reduces the switch's loss contribution to the system noise figure of the receiver 101. A traditional switch could have been at this position in the receiver. However, it would be expensive to add the complexity of matching each mixer 125 and 129 to the input terminals of the traditional switch, passing the signal through the traditional switch to its output terminal, and matching this output terminal to the input terminal of the first IF stage 131. The loss of the traditional switch would would be substantially higher than the loss contribution of the present invention.

For example, in the prior art a traditional pin diode switch can be biased for losses as low as 0.4 dB with a significant bias current dissipation of 50 mA. Gallium arsenide switches have higher losses of 1.2 dB with reduced currents. Both the pin diode and the gallium arsenide antenna switch implementations are expensive. Configuring a conventional switch before a gain stage in a receiver will result in a loss in receiver sensitivity equal to the switch network's loss. Configuring the switch after a gain stage in a receiver will result in less than 2 dB loss in receiver sensitivity. Losses for a traditional switch network including a matching network, the antenna switch and a matching network are as high as 2 dB, (0.5+1+0.5 dB). This puts a design burden on the first gain stage to have a large gain (>10 dB) to take over the noise and reduce its loss contribution to the system noise figure to an acceptable level. Each configuration has cost and design penalties. The present invention has a system noise figure degradation of as low as 0.1 dB, has minimal current penalty for the inverter and low parts count for occupying precious printed circuit board space. These improvements represent a significant improvement over existing antenna switch art.

The present invention advantageously symmetrical matches the outputs 126 and 130 of mixers 125 and 129 and the input of the first IF stage 131. The enabled mixer will present an "enabled impedance" to the input of the first IF stage 131. The disabled mixer will present a "disabled impedance" to the input of the first IF stage 131. By alternatively enabling mixers 125 and 129 the "enabled impedance" of one mixer and the "disabled impedance" of the other mixer are see at the input of the first IF stage 131. Symmetrical matching outputs of the mixers 125 and 129 maintains a desirable constant impedance to the input of the first IF stage 131.

In the preferred embodiment of the present invention, the antenna switch alternatively enables mixers 125 and 129. The mixers 125 and 129 represent any active gain stage, including traditional amplifiers, to be selectively enabled. Furthermore, the active stages may be located at any position in the receiver line up and not limited to location of the first mixers.

The first antenna 109 receives a first signal 108 in a first predetermined frequency band. The second antenna 109 receives a second signal 110 in a second predetermined frequency band. In the preferred embodiment of the present invention, the first 103 and the second 110 signals are included in substantially the same frequency band and transmitted from the same source. In this case both the first antenna 109 and the second antenna 111 and their associated first path and the second path for receiving a signals share a common design which is dependent on the predetermined frequency band of the signals to be received. The antenna switch 136 is used to select one of the first antenna 109 and the second antenna 111 for receiving the signal depending on the quality of the signal at each antenna. Alternatively, the predetermined frequency bands of the first and the second signals may be different. In this case the design of the first antenna 109 and its associated first path for receiving a signal in the first frequency band is different from the design of the second antenna 111 and its associated second path for receiving a signal in the second frequency band. The differences are dependent on the predetermined frequency bands of the first and the second signals to be received. Thus, the antenna switch 136 may also be used for a dual mode receiver (i.e. a receiver designed to received signals from two different frequency bands). If needed, the local oscillator 117 and the demodulator 135 can also be controlled in the dual mode receiver responsive to the antenna select signal at line 141 (dotted line).

The transmitter 103 couples the controller 103 to the second antenna 111. The transmitter includes a transmitting unit 139 coupled to a bandpass filter 137. The transmitter 103 in combination with the receiver 101 produce the transceiver 100 that receives and transmits RF signals. The frequency characteristics of the bandpass filters 114 and 137 are different to allow the transceiver 100 to send and receive RF signals via the second antenna 111 simultaneously. The transceiver 100 represents a portable or mobile unit, such as a cellular radiotelephone, in the preferred embodiment but may alternatively represent a fixed base station unit, such as that used in cellular radiotelephone systems.

Figure 2:
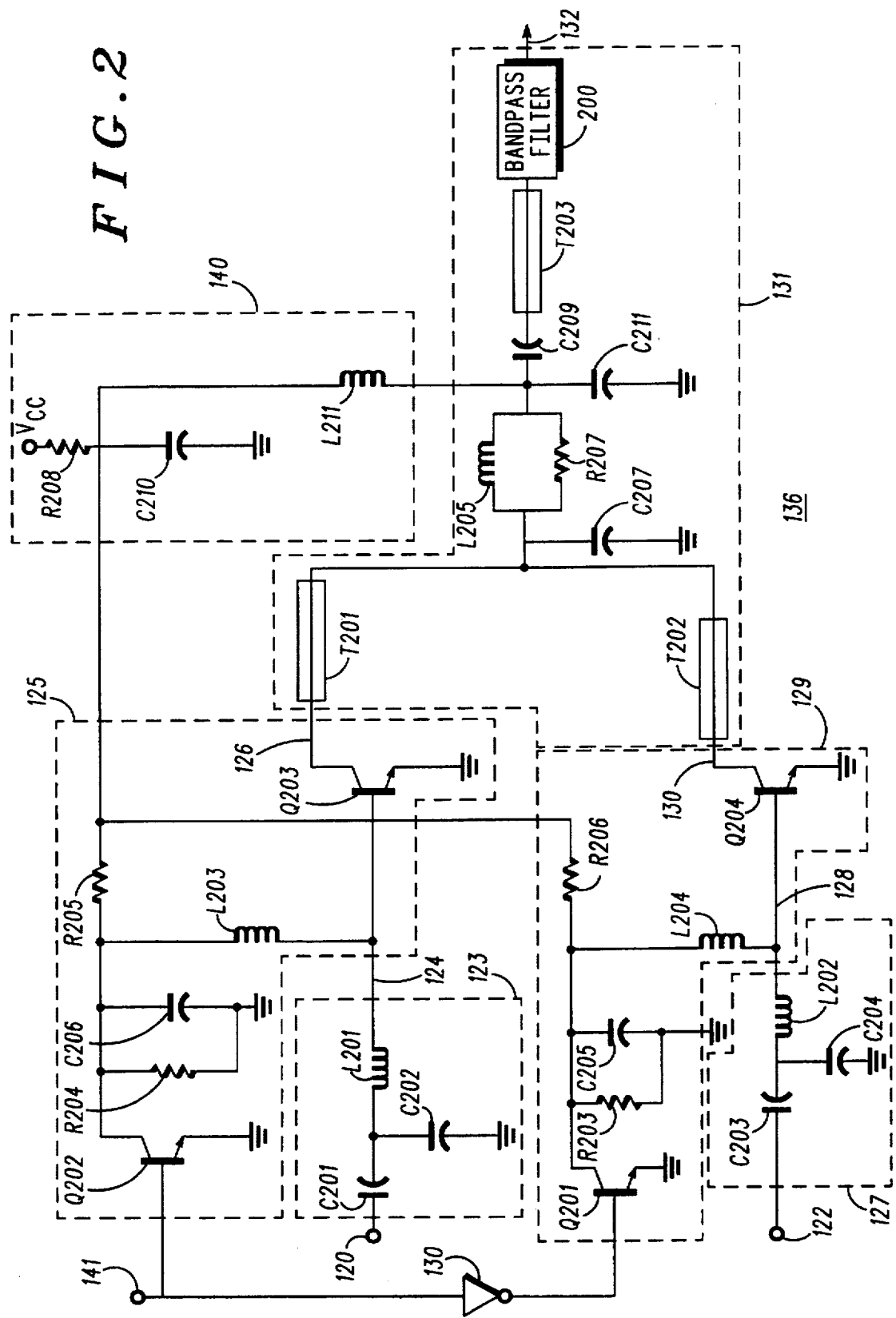
FIG. 2 is a schematic diagram of the antenna switch of FIG. 1.

Referring now to FIG. 2 there is shown a schematic diagram of the antenna switch 136 of FIG. 1. Portions of the schematic diagram are outlined to correspond to the matching networks 123 and 127, the mixers 125 and 129, the inverter 138, the first IF stage 131 and the DC bias network 140 of FIG. 1. Line 120 is coupled to matching network 123 which includes a capacitor C201, a capacitor C202 and an inductor L201.

Beginning with the matching network 123, the capacitor C201 couples the line 120 to one terminal of the inductor L201 and the capacitor C202. The second terminal of the capacitor C202 is grounded. The second terminal of the inductor L201 is coupled to the mixer 125. The matching network 123 matches the impedance at line 120 to a the impedance at the mixer 125.

The mixer 125 includes a transistor Q202, a resistor R204, a capacitor C206, a resister R205, an inductor L203, and a transistor Q203. The mixer 125 has inputs for receiving signals from the matching network 123, the antenna select line 141 and from the D.C. bias network 140. The antenna select signal at line 141 is coupled to the base terminal of the transistor Q202. The emitter terminal of the transistor Q202 is grounded and the collector terminal is coupled to a first terminal of the resistor R204, the capacitor C206, the inductor L203 and the resistor R205. The second terminal of the resistor R204 and the capacitor C206 are grounded. The second terminal of inductor L203 is coupled to the base terminal of the transistor Q203. The second terminal of the resistor R205 is coupled to the DC bias network 140 and the mixer 129. The emitter terminal of the transistor Q203 is grounded and the collector terminal 126 provides the output of the mixer 125. The resistor R204 and the resistor R205 in combination with the DC bias network 140 provide a voltage bias for the transistor Q203. The capacitor C206 and the inductor L203 provide a tank circuit that is series resonant at the first intermediate frequency.

The matching network 127 coupling line 122 to the mixer 129 includes a capacitor C203, an inductor L202, and a capacitor C204. The match circuit 127 has the same topography and operates in the same fashion as the match circuit 123 described above.

The mixer 129 has inputs for receiving signals from the matching network 127, the antenna select line 141 via the inverter 138 and from the D.C. bias network 140. The mixer 129 includes a transistor Q201, a resistor R203, a capacitor C205, a resistor R206, an inductor L204 and a transistor Q204 has the same topography and operates in the same fashion as the mixer 125 described above.

The first IF stage 131 receives inputs at 126 and 130 from the mixer 125, the mixer 129 and the DC bias network 140 to produce an output at line 132. The first IF stage 131 includes transmission lines T201, T202 and T203, a capacitor C207, an inductor L205, a resistor R207, a capacitor C211, a capacitor C209 and a bandpass filter 200. The collector terminal 126 of the mixer 125 is coupled to a first terminal of the transmission line T201. Likewise, the collector terminal 130 of the mixer 129 is coupled to a first terminal of the transmission line T202. A second terminal of the transmission line T201 is coupled to a second terminal of the transmission line T202. The junction of the second terminals of the transmission lines T201 and T202 is coupled to a first terminal of the capacitor C207 and a first terminal of the inductor L205 and a first terminal of the resistor R207. The second terminal of capacitor C207 is grounded. The second terminal of the inductor L205 and the second terminal of the resistor R207 are coupled to a first terminal of the capacitor C211, a first terminal of terminal of the capacitor C209 and the DC bias network 140. A second terminal of the capacitor C211 is grounded. A second terminal of the capacitor C209 is coupled to a first terminal of the transmission line T203. A second terminal of the transmission line T203 is coupled to a bandpass filter 200. The output terminal 132 of the bandpass filter 200 is coupled to the second IF stage 133 of FIG. 1. The transmission line T201 and the capacitor C207 or the transmission line T202 and the capacitor C207 form a series resonant short at both the local oscillator frequency and the radio frequency signal. The inductor L205, the resistor R207, the capacitor C211, the capacitor C209 and the transmission line T203 form a matching network to match between the output of either mixer 125 or mixer 129 and the bandpass filter 200.

Since the mixers 125 and 129 are alternatively enabled, the impedance formed by the first IF stage 131 includes the impedance seen at the output of the enabled mixer as well as the impedance seen at the output of the disabled mixer.

The DC bias network 140 includes a resistor R208, a capacitor C210 and an inductor L211. The DC bias network 140 conventionally provides a voltage bias for the mixers 125 and 129 and the first IF stage 131.

FIG. 3 is a process flow diagram describing a method of operation of the diversity receiver 10 1 of FIG. 1. The flow starts at step 301. At step 303, a first RF signal is received via a first path including in series: a first antenna 109, a first bandpass filter 113, a first matching network 123, a first mixer 125 having a first output terminal. At step 305, a second RF signal is received via a second path including in series: a second antenna 111, a second bandpass filter 114, a second matching network 127, a second mixer 129 having a second output terminal. At step 307, the the first path and the second path are combined via a third path at the output terminals of the first and second mixers 125 and 129. At step 309, the first mixer and the second mixer are alternatively enabled for alternatively coupling the first RF signal and the second RF signal, respectively, to the third path.

In the preferred embodiment of the present invention transistors Q201-4 are available from Motorola Inc. under part nos. MSD1819A-RT1 (Q201 and Q202) and MRF941 (Q203 and Q204). Transmission lines T201 and T202 have a physical length of 11.43 mm and T203 has a physical length of 27.94 mm. The values for the resistors, capacitors and inductors are as follows:

| | |
|---|---|
| R203, R204 and R207 = 2.7 KΩ | L201 and L202 = 15 nH |
| R205 and R206 = 10 KΩ | L203 and L204 = 68 nH |
| R208 = 330 Ω | L205 = 390 nH |
| | L211 = 1000 nH |
| C201 and C202 = 27 pF | C209 = 10,000 pF |
| C203 and C204 = 2.7 pF | C210 = 1500 pF |
| C205 and C206 = 33 pF | C211 = 18 pF |
| C207 = 6.8 pF | |

I claim:

1. An antenna switch operative to switch between at least a first antenna and a second antenna comprising:

a first active mixer having an input terminal coupled to the first antenna and having an output terminal, the first active mixer having a first output impedance when the first active mixer is enabled and a second output impedance when the first active mixer is disabled;

a second active mixer having an input terminal coupled to the second antenna and having an output terminal, the second active mixer having a first output impedance when the second active mixer is enabled and a second output impedance when the second active mixer is disabled;

a matching network directly connected to the output terminal of the first active mixer and the output terminal of the second active mixer, the matching network having an input impedance; and a controller operative to alternatively enable the first and the second active mixers, the first output impedance of the first active mixer in combination with the second output impedance of the second active mixer matching the input impedance of the matching network, and the second output impedance of the first active mixer in combination with the first output impedance of the second active mixer matching the input impedance of the matching network.

2. An antenna switch according to claim 1 wherein the first antenna receives a first signal in a first predetermined frequency band and the second antenna receives a second signal in a second predetermined frequency band.

3. An antenna switch according to claim 2 wherein the first and second signals are in substantially the same predetermined frequency band.

4. An antenna switch according to claim 2 wherein the first and second signals are in substantially different predetermined frequency bands.

5. An antenna switch according to claim 1 wherein the matching network further comprises:

a first transmission line having an input terminal directly connected to the output terminal of the first active mixer, and having an output terminal; and a second transmission line having an input terminal directly connected to the output terminal of the second active mixer, and having an output terminal;

wherein the output terminal of the first transmission line is connected to the output terminal of the second transmission line.

6. A receiver comprising:

at least a first antenna and a second antenna;

an antenna switch operative to switch between the first antenna and the second antenna, including:

a first active mixer having an input terminal coupled to the first antenna and having an output terminal, the first active mixer having a first output impedance when the first active mixer is enabled and a second output impedance when the first active mixer is disabled;

a second active mixer an input terminal coupled to the second antenna and having an output terminal, the second active mixer having a first output impedance when the second active mixer is enabled and a second output impedance when the second active mixer is disabled;

a matching network directly connected to the output terminal of the first active mixer and the output terminal of the second active mixer, the matching network having an .input impedance; and a controller operative to alternatively enable the first and the second active mixers, the first output impedance of the first active mixer in combination with the second output impedance of the second active mixer matching the input impedance of the matching network, and the second output impedance of the first active mixer in combination with the first output impedance of the second active mixer matching the input impedance of the matching network; and a demodulator coupled to the matching network.

7. A receiver according to claim 6 wherein the matching network further comprises:

a first transmission line having an input terminal directly connected to the output terminal of the first active mixer, and having an output terminal; and a second transmission line having an input terminal directly connected to the output terminal of the second active mixer, and having an output terminal;

wherein the output terminal of the first transmission line is connected to the output terminal of the second transmission line.

8. A transceiver comprising:

at least a first antenna and a second antenna;

a transmitter coupled to the second antenna; and a receiver coupled to the first antenna and the second antenna, including:

an antenna switch operative to switch between the first antenna and the second antenna, the antenna switch including:

a first active mixer having an input terminal coupled to the first antenna and having an output terminal, the first active mixer having a first output impedance when the first active mixer is enabled and a second output impedance when the first active mixer is disabled;

a second active mixer having an input terminal coupled to the second antenna and having an output terminal, the second active mixer having a first output impedance when the second active mixer is enabled and a second output impedance when the second active mixer is disabled;

a matching network directly connected to output terminal of the first active mixer and the output terminal of the second active mixer, the matching network having an input impedance; and a controller operative to alternatively enable the first and the second active mixers, the first output impedance of the first active mixer in combination with the second output impedance of the second active mixer matching the input impedance of the matching network, and the second output impedance of the first active mixer in combination with the first output impedance of the second active mixer matching the input impedance of the matching network; and a demodulator coupled to the matching network.

9. A transceiver according to claim 8 wherein the matching network further comprises:

a first transmission line having an input terminal directly connected to the output terminal of the first active mixer, and having an output terminal; and a second transmission line having an input terminal directly connected to the output terminal of the second active mixer, and having an output terminal;

wherein the output terminal of the first transmission line is connected to the output terminal of the second transmission line.

10. A receiver comprising:

a first path for receiving a first radio frequency (RF) signal including in series: a first antenna, a first bandpass filter, a first matching network and a first active mixer, the first active mixer having a first output impedance when the first active mixer is enabled and a second output impedance when the first active mixer is disabled;

a second path for receiving a second RF signal including in series: a second antenna, a second bandpass filter, a second matching network and a second active mixer, the second active mixer having a first output impedance when the second active mixer is enabled and a second output impedance when the second active mixer is disabled;

a third matching network directly connected to the first path and the second path at an output terminal of the first active mixer and an output terminal of the second active mixer, respectively, the third matching network having an input impedance; and a controller operative to alternatively enable the first active mixer and the second active mixer to alternatively couple the first RF signal and the second RF signal, respectively, to the third matching network, the first output impedance of the first active mixer in combination with the second output impedance of the second active mixer matching the input impedance of the matching network, and the second output impedance of the first active mixer in combination with the first output impedance of the second active mixer matching the input impedance of the matching network.

11. A receiver according to claim 11 wherein the matching network further comprises:

a first transmission line having an input terminal directly connected to the output terminal of the first active mixer, and having an output terminal; and a second transmission line having an input terminal directly connected to the output terminal of the second active mixer, and having an output terminal;

wherein the output terminal of the first transmission line is connected to the output terminal of the second transmission line.

12. A method for switching between at least a first antenna and a second antenna comprising the step of:

alternatively enabling first and second active mixers, the first active mixer has an input terminal coupled to the first antenna and has an output terminal, the first active mixer having a first output impedance when the first active mixer is enabled and a second output impedance when the first active mixer is disabled the second active mixer has an input terminal coupled to the second antenna and has an output terminal, the second active mixer having a first output impedance when the second active mixer is enabled and a second output impedance when the second active mixer is disabled, the output terminal of the first active mixer and the output terminal of the second active mixer are directly connected to a matching network, the matching network having an input impedance, the first output impedance of the first active mixer in combination with the second output impedance of the second active mixer matching the input impedance of the matching network, and the second output impedance of the first active mixer in combination with the first output impedance of the second active mixer matching the input impedance of the matching network.

13. A method for receiving a radio frequency (RF) signal received by at least one of a first antenna and a second antenna, comprising the steps of:

alternatively enabling first and second active mixers, the first active mixer has an input terminal coupled to the first antenna and has an output terminal, the first active mixer having a first output impedance when the first active mixer is enabled and a second output impedance when the first active mixer is disabled the second active mixer has an input terminal coupled to the second antenna and has an output terminal, the second active mixer having a first output impedance when the second active mixer is enabled and a second output impedance when the second active mixer is disabled, the output terminal of the first active mixer and the output terminal of the second active mixer are directly connected to a matching network, the matching network having an input impedance, the first output impedance of the first active mixer in combination with the second output impedance of the second active mixer matching the input impedance of the matching network, and the second output impedance of the first active mixer in combination with the first output impedance of the second active mixer matching the input impedance of the matching network; and demodulating the RF signal present at the output terminal of at least one of the first active mixer and the second active mixer.

14. A method of operating a receiver comprising the steps of:

receiving a first radio frequency (RF) signal via a first path including in series: a first antenna, a first bandpass filter, a first matching network, a first active mixer and a first output terminal, the first active mixer having a first output impedance when the first active mixer is enabled and a second output impedance when the first active mixer is disabled;

receiving a second RF signal via a second path including in series: a second antenna, a second bandpass filter, a second matching network, a second active mixer, and a second output terminal, the second active mixer having a first output impedance when the second active mixer is enabled and a second output impedance when the second active mixer is disabled, wherein an output terminal of the first active mixer and an output terminal of the second active mixer are directly connected to a third matching network, the third matching network having an input impedance; and alternatively enabling the first active mixer and the second active mixer for alternatively coupling the first RF signal and the second RF signal, respectively, to the matching network, the first output impedance of the first active mixer in combination with the second output impedance of the second active mixer matching the input impedance of the matching network, and the second output impedance of the first active mixer in combination with the first output impedance of the second active mixer matching the input impedance of the matching network.

* * * * *

UNITED STATES PATENT AND TRADEMARK OFFICE
CERTIFICATE OF CORRECTION

PATENT NO. : 5,630,213
DATED : May 13, 1997
INVENTOR(S) : Vannatta

It is certified that error appears in the above-indentified patent and that said Letters Patent is hereby corrected as shown below:

Column 8,
<u>Claim 11</u>

In line 1, please replace "according to claim 11" with --according to claim 10--.

Signed and Sealed this

Seventh Day of October, 1997

*Attest:*

BRUCE LEHMAN

*Attesting Officer*      Commissioner of Patents and Trademarks